United States Patent
Seo et al.

(10) Patent No.: US 7,440,165 B2
(45) Date of Patent: Oct. 21, 2008

(54) OPTICAL FIBER

(75) Inventors: Hong Seok Seo, Daejeon (KR); Joon Tae Ahn, Daejeon (KR); Woon Jin Chung, Seoul (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 11/196,717

(22) Filed: Aug. 3, 2005

(65) Prior Publication Data

US 2006/0126161 A1    Jun. 15, 2006

(30) Foreign Application Priority Data

Dec. 14, 2000    (KR) .................. 10-2004-0105690

(51) Int. Cl.
*H01S 4/00* (2006.01)
*G02B 6/036* (2006.01)

(52) U.S. Cl. ............... 359/334; 359/341.5; 359/341.31; 385/123; 385/126; 385/127

(58) Field of Classification Search .......... 359/334, 359/341.31, 341.5; 385/123, 126, 127
See application file for complete search history.

(56) References Cited

U.S. PATENT DOCUMENTS

| | | | | |
|---|---|---|---|---|
| 5,259,046 A * | 11/1993 | DiGiovanni et al. | ........... | 385/12 |
| 5,696,782 A * | 12/1997 | Harter et al. | ................... | 372/25 |
| 5,778,129 A * | 7/1998 | Shukunami et al. | ......... | 385/127 |
| 5,883,736 A * | 3/1999 | Oshima et al. | ......... | 359/341.33 |
| 6,275,627 B1 * | 8/2001 | Wu | .............................. | 385/28 |
| 6,288,835 B1 * | 9/2001 | Nilsson et al. | ........... | 359/341.3 |
| 6,611,370 B2 * | 8/2003 | Namiki et al. | ............... | 359/334 |
| 6,621,624 B2 * | 9/2003 | Whalen et al. | ........... | 359/341.1 |
| 6,757,474 B2 * | 6/2004 | Anderson et al. | ........... | 385/142 |
| 6,771,414 B2 * | 8/2004 | Masuda et al. | ........... | 359/341.1 |
| 2001/0036007 A1 | 11/2001 | Endo et al. | | |
| 2002/0167717 A1 | 11/2002 | Masuda et al. | | |
| 2003/0076580 A1 * | 4/2003 | Andrejco et al. | ......... | 359/341.5 |
| 2003/0161031 A1 | 8/2003 | Benjamin et al. | | |

(Continued)

FOREIGN PATENT DOCUMENTS

| | | |
|---|---|---|
| EP | 1648055 | 4/2006 |
| KR | 2002-0038735 | 5/2002 |
| KR | 20030089217 | 11/2003 |

OTHER PUBLICATIONS

'Simultaneous Amplification by Er Ions and SRS in an Er-Doped Germano-Silica Fiber' Seo et al., IEEE Photonics Technology Letters, vol. 15, No. 9, Sep. 20003, pp. 1198-1200.

(Continued)

*Primary Examiner*—Eric Bolda
(74) *Attorney, Agent, or Firm*—Ladas & Parry LLP (57) ABSTRACT

Provided is an optical fiber. The optical fiber includes a core and a cladding, the core containing a first element for inducing non-linear Raman phenomenon, and the cladding containing a second element which is a rare earth element, wherein when the optical fiber is pumped by two pumping light sources having different wavelengths with each other, the optical signals in the first and third band are Raman-amplified by the first element and the signals in the second band are amplified by a direct transition of the second element.

17 Claims, 7 Drawing Sheets

U.S. PATENT DOCUMENTS

| | | | |
|---|---|---|---|
| 2003/0215241 A1 | 11/2003 | Hwang et al. | |
| 2004/0114212 A1* | 6/2004 | Hwang et al. | 359/334 |
| 2004/0196536 A1* | 10/2004 | Bourova et al. | 359/341.1 |
| 2005/0190433 A1* | 9/2005 | Seo et al. | 359/341.1 |
| 2005/0195472 A1* | 9/2005 | Tang | 359/333 |

OTHER PUBLICATIONS

T.N. Nielsen, et al; "3.28-TB/S (82×40GB/S) transmission over 3×100KM Nonzero-dispersion fiber using dual C- and L-bank hybrid Raman/Erbium-doped inline amplifiers;" Optical Fiber Communication Conference. (OFC) Technical Digest Postconference Edition. Baltimore MD, Mar. 7-10, 2000, New York, NY, IEEE, US, vol. 4 of 4, Mar. 7, 2000 pp. 236-238, XP001036110.

H.S. Seo, et al; "Simultaneous Amplification by Er Ions and SRS in an Er-Doped Germano-Silica Fiber;" IEEE Photonics Technology Letters, IEEE Service Center, Piscataway, NJ, US. vol. 15, No. 9, Sep. 2003, pp. 1198-1200, XP011100098.

* cited by examiner

OPTICAL FIBER

CROSS-REFERENCE TO RELATED APPLICATION

This application claims priority to and the benefit of Korean Patent Application No. 2004-105690, filed Dec. 14, 2004, the disclosure of which is incorporated herein by reference in its entirety.

BACKGROUND

1. Field of the Invention

The present invention relates to an optical fiber and, more particularly, to an optical fiber for an optical amplifier which is configured to perform optical signal amplification by a rare earth element doped into the optical fiber and optical signal amplification by a non-linear Raman effect of a core composition material, in which the optical amplification band by the rare earth elements and the optical amplification band by the Raman effect simultaneously occur or have different bands not to overlap.

2. Discussion of Related Art

In general, a Raman optical amplifier and an erbium-doped fiber amplifier (EDFA) have been widely researched as an amplifier which is very important in a wavelength division multiplex (WDM) optical communication system with development of a high power semiconductor laser diode.

The EDFA can perform amplification of more than 80 nm due to development of L-band amplification as well as C-band amplification. However, the EDFA which can perform S-band amplification has been attempted but is not commercialized yet. There was an attempt to amplify an S-band by arranging a C-band reduction filter in the EDFA. However, the S-band EDFA is too low in final optical output power and so it was not put to practical use. For these reasons, the Raman optical amplifier has been suggested as an alternative for the S-band.

The Raman optical amplifier has a gain region depending on a pumping wavelength and thus can amplify a band which the EDFA cannot amplify. The Raman optical amplifier can extend a gain bandwidth by more than 100 nm by multi-wavelength pumping, and a distributed type Raman optical amplifier which uses a transmission medium as an amplification medium can greatly improve an optical signal to noise ratio (OSNR). On the contrary, the Raman optical amplifier has disadvantage in that it needs an optical fiber for non-linear optical amplification which is relatively long.

SUMMARY OF THE INVENTION

The present invention is directed to an optical amplifier in which optical amplification band by a rare earth element and optical amplification band by Raman occur simultaneously or have different bands not to overlap.

The present invention is also directed to a method of obtaining optimum gain flatness by analyzing a gain characteristic according to density of a rare earth element in an optical fiber and controlling optical pumping power and length of the optical fiber for an amplification band by a rare earth element and an amplification band by Raman.

The first aspect of the present invention is to provide an optical fiber including: a core containing the first element for inducing non-linear Raman phenomenon; and a cladding containing the second element which is a rare earth element, wherein when the optical fiber is pumped by two pumping light sources having different wavelengths with each other, the optical signals in the first and third bands are Raman-amplified by the first element and the optical signals in the second band are amplified by a direct-transition of the second element.

The first band may be an S-band, the second band may be a C-band, and the third band may be an L-band.

In a case where a composition material of the optical fiber is silica fiber doped with a germanium and erbium corresponding to the first and second elements, respectively, when the optical fiber is pumped by two pumping light sources having a wavelength band of 1,380 nm to 1,420 nm and a wavelength band of 1,480 nm to 1,500 nm, the S-band (1,490 nm to 1,530 nm), C-band (1,530 nm to 1,570 nm), and L-band (1,570 nm to 1,610 nm) signals are simultaneously amplified by non-linear Raman amplification of germanium, a direct transition of erbium and non-linear Raman amplification of germanium, respectively.

The second aspect of the present invention is to provide an optical fiber including: a core containing the first element for inducing non-linear Raman phenomenon; and a cladding containing the second element which is a rare earth element, wherein when the optical fiber is pumped by a pump beam operating at a single wavelength, the S-band (1,490 nm to 1,530 nm) signals are Raman-amplified by the first element in the core and the C-band (1,530 nm to 1,570 nm) signals are amplified by the second element in the cladding.

The third aspect of the present invention is to provide an optical fiber including: at least one optical fiber in which the first element is doped for inducing non-linear Raman amplification and at least one optical fiber in which the second element which is a rare earth element is doped, which are coupled in series, wherein when the optical fiber is pumped by two pumping light sources having different wavelengths with each other, the first band signals are Raman-amplified by the fiber containing the first element and the second band signals are amplified through the fiber doped with the second element and the third band signals are Raman-amplified in the fiber with the first element.

The fourth aspect of the present invention is to provide an optical fiber including: at least one optical fiber in which the first element is doped for inducing non-linear Raman amplification and at least one optical fiber in which the second element which is a rare earth element is doped, which are coupled in series, wherein when the optical fiber is pumped by a pump beam operating at a single wavelength, the S-band signals (1,490 nm to 1,530 nm) are Raman-amplified by the fiber containing the first element and the C-band signals (1,530 nm to 1,570 nm) are amplified through the fiber doped with the second element.

In case of the fiber medium configured with Ge-doped core and Er-doped cladding which amplifies S-band optical signals by Raman and amplifies C-band optical signals by erbium, a fiber length of at least several kilometers is needed to obtain a desired Raman optical gain in S-band. Thus, erbium in the silica optical fiber should be doped at a density of about one several hundredths ($10^{15}$ to $10^{17}$ $cm^{-3}$) of the conventional or existing Er-doped fiber because it should obtain the C-band optical amplification within several kilometers of the same length.

Here, if density of germanium is in a range between 10 mol % to 20 mol %, a refractive index difference between the core and the cladding is 0.015 to 0.03, so that sufficient Raman optical amplification can be obtained with a length of several kilometers.

If the optical fiber manufactured in the way described above is pumped by the high power semiconductor laser having a wavelength of 1.411 µm, the C-band optical signals are amplified by erbium of the cladding, and the remaining pump beam which is not absorbed by erbium is used for non-linear Raman amplification, so that the S-band signal is amplified at a wavelength band of 1.52 μm corresponding to Raman transition of the pump beam.

Amplitude of gain obtained in the S- and C-bands depends on density of erbium and density of germanium in the optical fiber, length of the optical fiber, optical loss, and pump power, and gain flatness can be obtained within 5 dB if length of the optical fiber and the pump power are controlled for the gain flatness.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

First Embodiment

Figure 1:
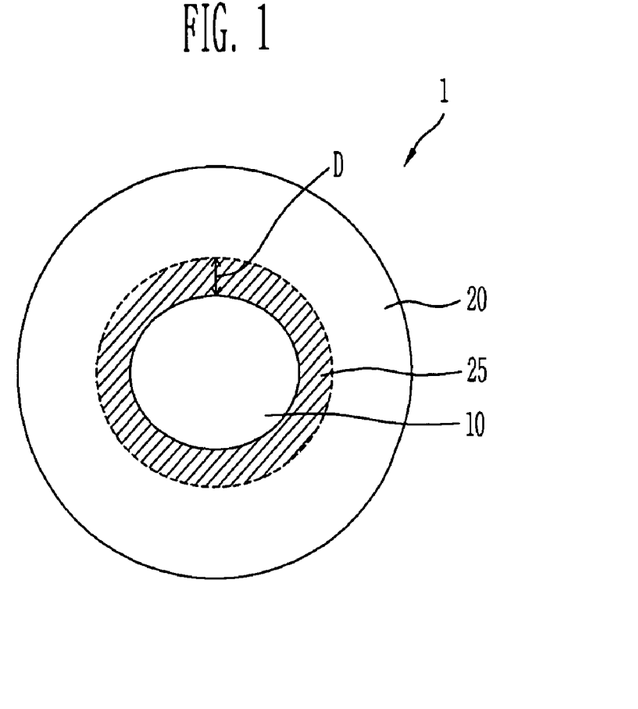
FIG. 1 is a schematic view of an optical fiber according to a first embodiment of the present invention.

FIG. 1 is a schematic view of an optical fiber according to a first embodiment of the present invention.

Referring to FIG. 1, the optical fiber 1 includes a core 10 and a cladding 20 in which the core 10 has a greater refractive index than the cladding 20. The first element to induce a non-linear Raman phenomenon is doped into the core 10, and the second element which is a rare earth element is doped in the cladding 20.

When the fiber is pumped by a pump beam operating at a single wavelength, S-band signals (1490 nm to 1530 nm) are Raman-amplified by the first element and C-band signals (1530 nm to 1570 nm) are amplified by the second element.

As a composition material of the optical fiber, silica, tellurite, fluoride, or sulfides is normally used. Preferably, the first elements used for Raman amplification are silica, germanium, phosphor, sulfur, tellurium, selenium, and so on which forms glass composition. The second elements making ionic amplification in the optical fiber are rare earth elements such as erbium, ytterbium, praseodymium, neodymium, holmium, thulium, dysprosium, and so on.

For example, in case of the optical fiber using silica elements, germanium of 10 mol % to 20 mol % is added to the core 10, so that the refractive index of the core 10 is 0.015 to 0.03 greater than that of the cladding 20. Also, aluminum and erbium are added to the adjacent cladding 20 of the core 10, so that the refractive index of the cladding 20 is the same as the neighboring cladding or is adjusted within error of about $10^{-3}$.

The pump beam proceeds along the core 10, and the erbium of the cladding 20 is excited by evanescent field of the pump beam. The C-band signals also proceed to the core 10 and are amplified by erbium ions excited by the pump beam. The remaining pump beam, not absorbed by erbium, is Raman-scattered at the wavelength range which is shifted to 100 nm from the wavelength of pump due to high density germanium in the core 10 so that the S-band signals which pass through this wavelength range are Raman-amplified.

As shown in FIG. 1, an erbium-doped region 25 of a ring shape is formed in the cladding region adjacent to the core 10. However, the erbium-doped region 25 is not limited to this and may be formed in the ring shape spaced apart from the core 10. Optical amplification characteristics by erbium are sensitively changed according to location of the erbium-doped region 25.

Figure 2:
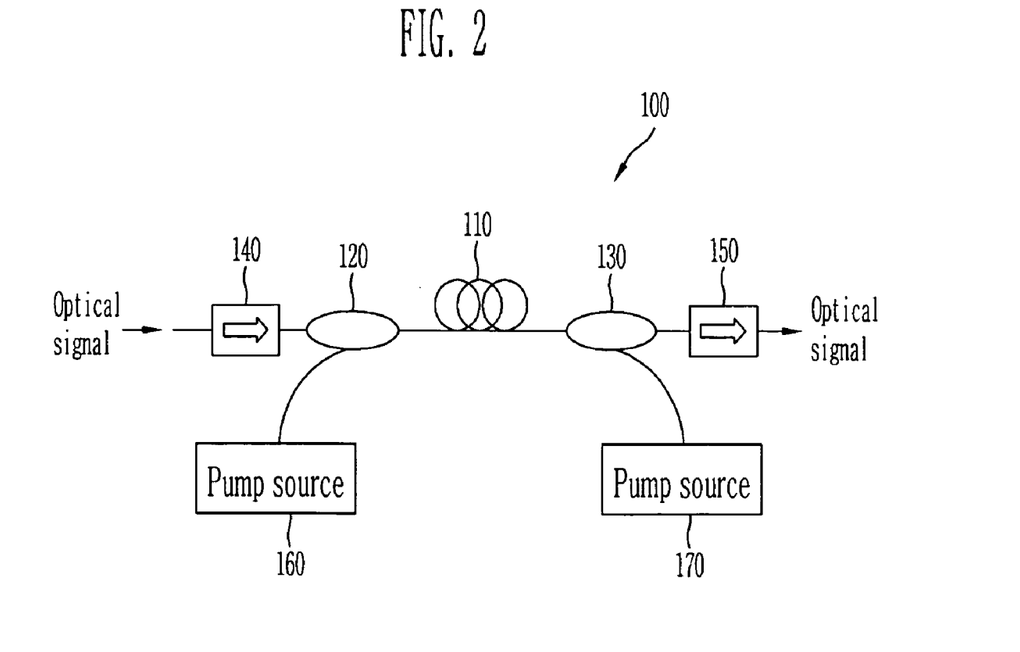
FIG. 2 is a schematic view of an optical fiber amplifier which employs the optical fiber of FIG. 1.

FIG. 2 is a schematic view of an optical fiber amplifier which employs the optical fiber of FIG. 1.

The optical fiber amplifier 100 includes first and second isolators 140 and 150, an optical fiber 110, first and second couplers 120 and 130, and first and second pump light sources 160 and 170.

The first isolator 140 passes an optical signal which is input to the optical fiber amplifier as it is and shields light which is input in a reverse direction, and the second isolator 150 passes light input through the second coupler 130 and shields an optical signal which is input in a reverse direction. The first and second isolators 140 and 150 are not components which are necessarily arranged.

The optical fiber 110 includes a core and a cladding. The first element is added to the core to amplify optical signals in the first band by non-linear Raman amplification, and the second element is doped to the cladding to amplify optical signals in the second band by a rare earth elements.

The first and second pump light sources, 160 and 170 preferably are pump lasers operating at a single wavelength in the range of 1380 nm to 1420 nm band and bi-directionally emit their pump energies into the optical fiber 110.

The first coupler 120 couples an optical signal from the first isolator 140 and pump beam from the first pump source 160 and inputs the resultant signals to the optical fiber 110, and the second coupler 130 passes the optical signal and inputs pump beam from the second pump source 170 in a reverse direction to the optical fiber 110.

In the first embodiment of the present invention, the optical fiber amplifier has a structure that two pump light sources and two WDM couplers are arranged, but it may have a structure that one pump light source and one WDM coupler are arranged at either side of the optical fiber 110.

For example, wavelength of the pump laser diode which is employed as the light sources 160 and 170 is fixed to 1.411

μm which is an optimum wavelength for simultaneously performing the C-band optical amplification and the S-band Raman optical amplification.

Figure 3:
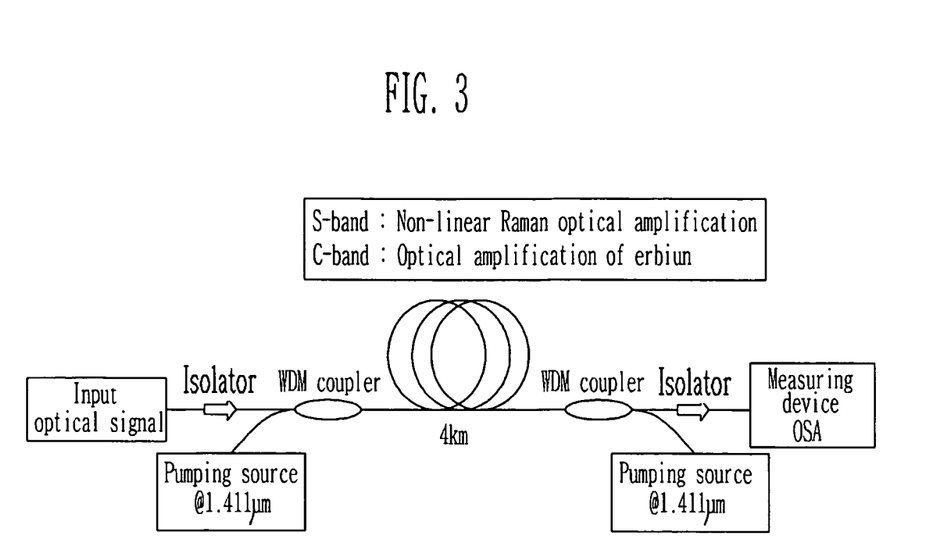
FIG. 3 is a configuration view illustrating the implementation of the optical amplifier of FIG. 2.

FIG. 3 is a configuration view illustrating the implementation of the optical amplifier of FIG. 2.

For example, the optical amplifier of FIG. 3 has a structure which pumps the optical fiber of 4 km in two directions by the pump laser with a wavelength of 1.411 μm. Length of the used optical fiber 110 is sufficiently long compared to length used in the C-band optical amplifier but is shorter compared to length used in the distributed type EDFA.

As optical fiber parameters used for computer simulation, a radius of the core is 2.4 μm, and a cut-off wavelength is fixed to 1.31 μm.

The cladding region which is erbium-doped is 2.6 μm apart from the center of the core, has a ring shape, and has a thickness of 2.6 μm. These values have closely affected the optical amplification characteristic by erbium and the optical amplification characteristic by Raman.

According to a distance between the erbium-doped region and the core, the optical amplification characteristic is sensitively changed, and a background loss value of the optical fiber is changed. A refractive index difference between the core and the cladding is 0.015. Here, Raman gain coefficient is determined by density of germanium and effective core area. Density of erbium in the cladding adjacent to the core of the optical fiber should have an optimum value to obtain a flat gain between the S-band and the C-band.

If the density of erbium is too high in the optical fiber of a certain length, most of the pump beams are absorbed by erbium ions which are not excited, so that the S-band optical signal is not Raman-amplified because power of the pump beam is low. If the density of erbium in the optical fiber is too low, the S-band optical signal is greatly amplified compared to the C-band optical signal. In the background loss of the optical fiber used in the computer simulation, since current erbium is put into the cladding other than the core during manufacturing process, a loss resulting from an OH bond according to erbium addition is increased mainly in the cladding, and so the total optical loss is improved compared to a case where erbium is doped into the core.

Figure 4:
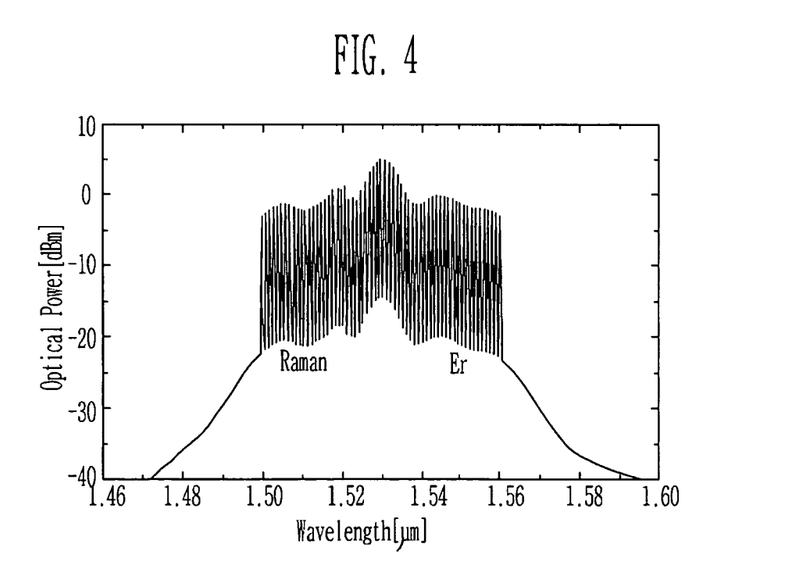
FIGS. 4 to 7 are graphs illustrating a computer simulation result of the optical amplifier of FIG. 3.

FIG. 4 is a computer simulation result of the optical amplifier of FIG. 3 showing an output spectrum when uniform optical signals of −25 dBm is given as input. In this case, the pumping power is 570 mW for both forward and backward, respectively. The density of erbium is $3 \times 10^{16}$ cm$^{-3}$ in the cladding and that of germanium is 10 mol % in the core. Since the wavelength of the pump source beam is 1.411 μm, the pump beam is gradually absorbed by erbium doped in the cladding of the optical fiber while it passes long length even though the absorption cross sectional area of erbium is quite low at 1.411 μm.

Basically, erbium ions already excited by absorption of the pump beam do not absorb optical signals in the absorption band (i.e., 1.41 μm to 1.61 μm). Therefore, if most of erbium ions by absorbing the pump beam are excited in the entire fiber length, Raman optical amplification is possible in the S-band (i.e., 1.50 μm to 1.53 μm). As shown in the graph of FIG. 4, a gain peak at a wavelength of 1.53 μm is a typical direct transition peak by erbium of cladding, and a gain peak by Raman is shown at 1.505 μm and 1.52 μm. Entirely, a band of 1.50 μm to 1.53 μm obtains a gain by stimulated Raman scattering, and a band of 1.53 μm to 1.565 μm obtains a gain by erbium ions. If a peak of the band of 1530 nm is filtered out, entirely uniform optical output of about 0 dBm can be obtained.

Figure 5:
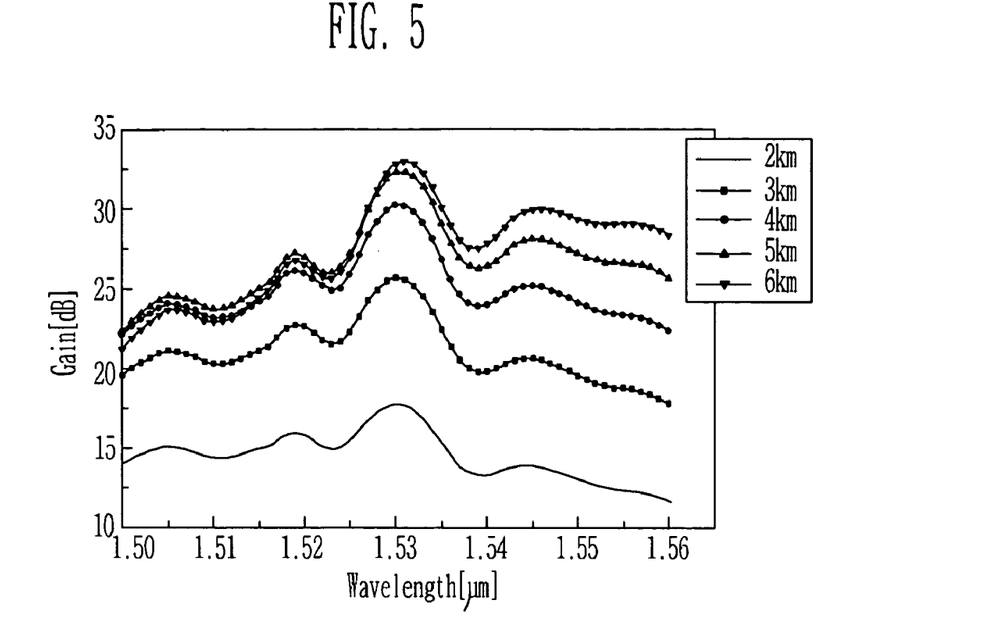

FIG. 5 is a graph illustrating a gain according to length of the optical fiber, where the pumping power is fixed to 570 mW in the optical amplifier of FIG. 3. In a case where the length of the optical fiber is 2 km, that is, in a case where intensity of the pump beam is sufficient high and the length of the optical fiber is relatively short, since the total number of erbium ions is small, the pump beam sufficiently excites all erbium ions and the remaining power is used to induce stimulated Raman scattering. In this case, a gain value of the S-band may be greater than that of the C-band. However, in a case where the length of the optical fiber is 5 km or more, the number of erbium ions is increased, so that more amount of the pump beam is absorbed by erbium ions as it passes longer length.

Such exhaustion of the pump beam greatly reduces the non-linear Raman optical amplification in the core, so that the total gain value of the S-band is greatly decreased. Also, some erbium ions which do not absorb the pump beam cause much optical absorption in the S-band, so that the S-band optical signals amplified by the Raman phenomenon are re-absorbed by erbium ions, thereby decreasing the total gain.

Thus, gain flatness can be obtained by adjusting length of the optical fiber to an optimum value in consideration of the S-band Raman optical gain value and the C-band optical gain value by erbium together with the given pumping power.

Figure 6:
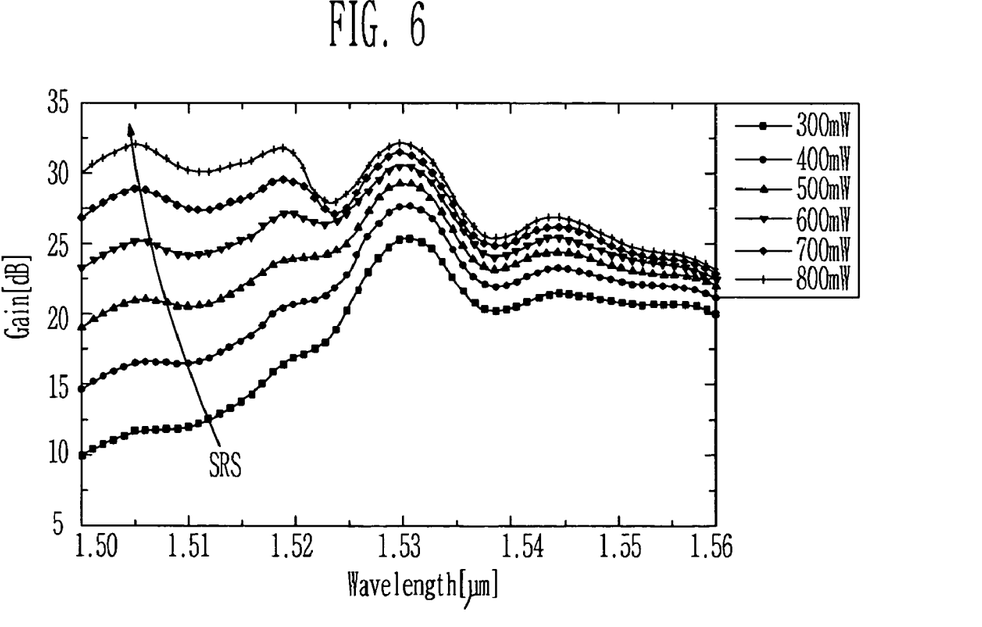

FIG. 6 is a graph illustrating gain variation obtained by controlling the pumping power in the optical amplifier of FIG. 3. Length of the optical fiber is fixed to 4 km. As the pumping power is increased, a gain peak by Raman is gradually increased at 1.505 μm and 1.52 μm.

Also, with increment of the pumping power, the C-band optical amplification band by erbium is increased by obtaining weakly Raman gain. Thus, in a case where the length of the optical fiber is fixed, it is possible to make gain bands of the S-band and the C-band flat by controlling the pumping power.

Figure 7A:
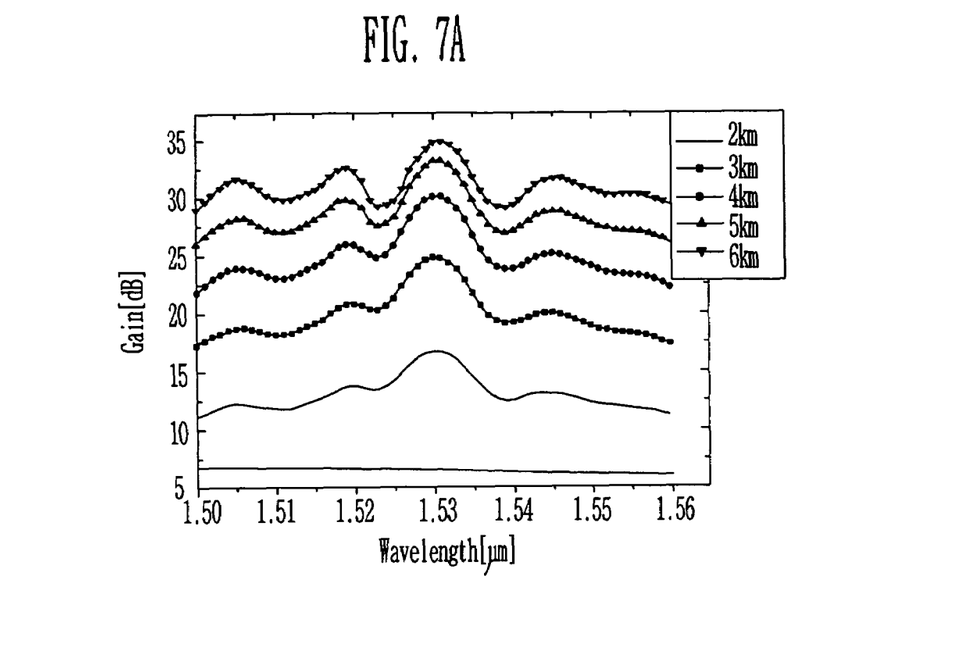

FIG. 7a is a graph illustrating a gain value and a noise figure which can be obtained in a condition for satisfying gain flatness by controlling the pumping power when given length of the optical fiber which has an erbium doping density of $3 \times 10^{16}$ cm$^{-3}$ in the cladding is constantly changed.

The optimum pumping power which can obtain gain flatness depends on length of the optical fiber. The used pumping power is 470 mW for both forward and backward when length of the optical fiber is 2 km, and it is increased to 510 mW, 570 mW, 670 mW, and 800 mW, respectively, when length of the optical fiber is 3, 4, 5, and 6 km. The entire gain is gradually increased by increasing the length of the optical fiber and the pumping power. The noise figure is in a range of 5.5 to 6.2 in all of the five cases.

Figure 7B:
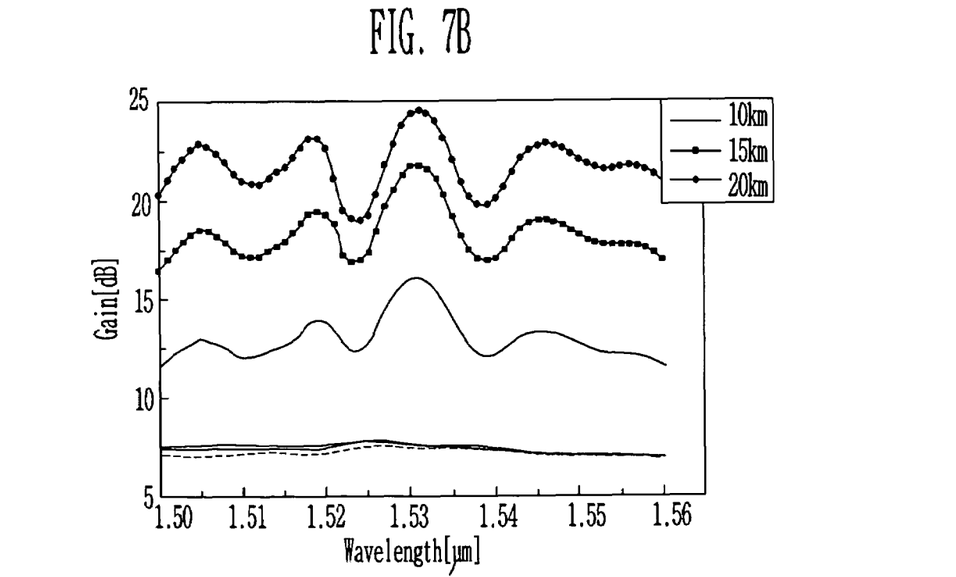

FIG. 7b is a graph illustrating a gain value and a noise figure which can be obtained in a condition for satisfying gain flatness by controlling the pumping power when given length of the optical fiber in which the erbium density is $1 \times 10^{16}$ cm$^{-3}$ in the adjacent cladding region is constantly changed. The pumping power is 250 mW for both forward and backward when length of the optical fiber is 10 km, and it is 330 mW and 430 mW, respectively, when length of the optical fiber is 15 km and 20 km.

The entire gain is gradually increased by increasing the length of the optical fiber and the pumping power, and the noise figure is in a range of 7.0 to 7.5 in all cases. In case of low density EDFA, since the optical fiber of the long length is used, the gain flatness is achieved with low pumping power. That is, the high density EDFA has high gain and low noise characteristics but it is inefficient in that the pumping power is too high, whereas the low density EDFA needs the optical fiber of long length but it is efficient in that the low pumping power is used. Length of the optical fiber and the pumping power can be reduced by controlling density of germanium, whereby it is possible to configure more efficient amplifier.

Meanwhile, characteristics of a distributed type Er—Ge-doped optical fiber and the optical amplifier having the same have been tested. If erbium is locally doped to a certain spot of the optical fiber other than the entire optical fiber, the similar result to the first embodiment of the present invention can be obtained.

For example, if the optical amplifier is configured using such hybrid optical fiber mediums that the optical fiber in which erbium is highly doped in the core at density of more than hundreds times of the first embodiment of the present invention and the optical fiber in which germanium of about 10 mol % to 20 mol % is doped in the core are connected in series, it is possible to simultaneously amplify the S-band and the C-band signals with the pumping light source.

Second Embodiment

Figure 8:
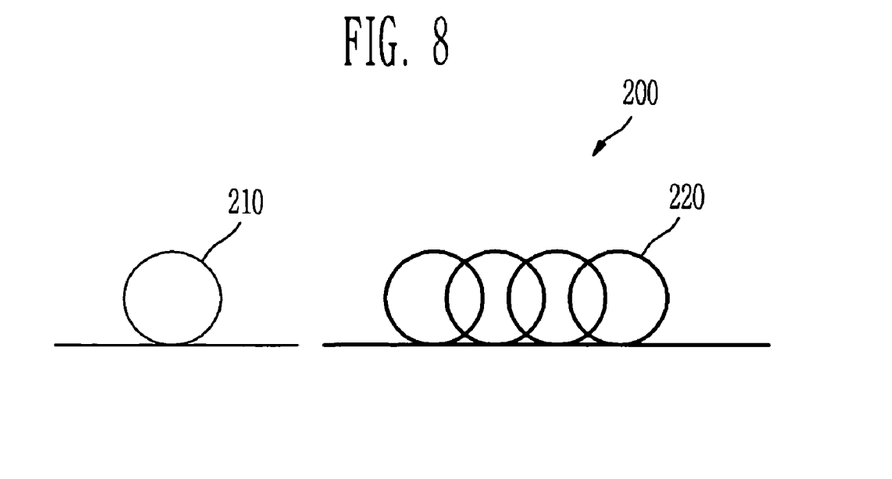
FIG. 8 is a schematic view of an optical fiber according to a second embodiment of the present invention.

FIG. 8 is a schematic view of an optical fiber according to a second embodiment of the present invention.

Referring to FIG. 8, the optical fiber 200 is configured such that at least the first sub optical fiber 220 in which the first element for causing the non-linear Raman amplification is doped and at least the second sub optical fiber 210 in which the second element which is a rare earth element is doped are coupled in series. By the pump beam which proceeds along the core, S-band (i.e., 1490 nm to 1530 nm) signals can be Raman-amplified in the optical fiber 220 doped with the first element and C-band (i.e., 1530 nm to 1570 nm) signals be amplified in the optical fiber 210 doped with the second elements.

FIG. 8 shows that at least one first sub optical fiber 220 in which the first element for causing the non-linear Raman amplification is doped and at least one second sub optical fiber 210 in which the second element which is a rare earth element is doped are coupled in series, but the number of combinations of those two optical fibers 210 and 220 is not limited, and two or more linear combinations using those two fibers may be used.

Figure 9:
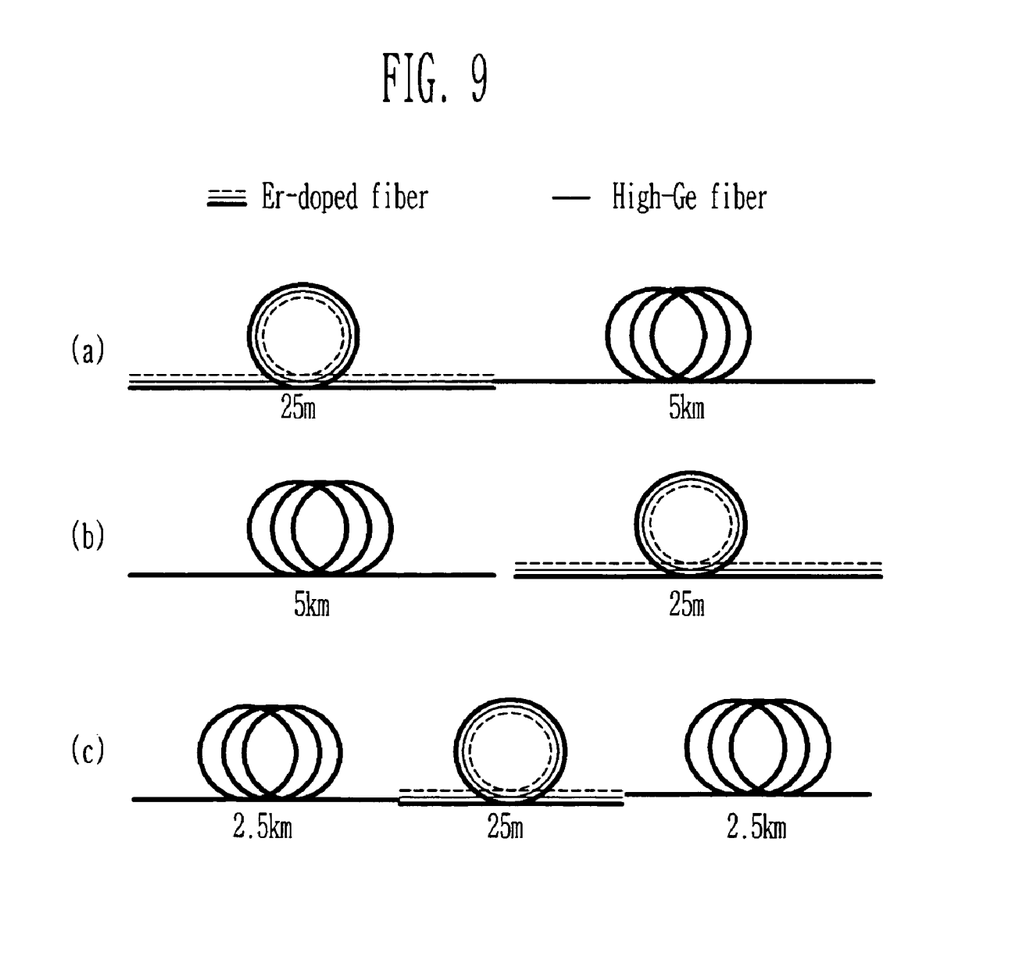
FIGS. 9A to 9C are views illustrating the implementations of the optical fiber of FIG. 8.

FIGS. 9A to 9C are views illustrating the implementations of the optical fiber of FIG. 8.

Referring to FIG. 9A, an conventional erbium-doped fiber (EDF) having a length of 25 m which is located at a front portion is coupled to a high density germanium-doped fiber, e.g., a dispersion compensated fiber (DCF) having a length of 5 km which is located at a rear portion (referred to as simply "EDF(25 m)DCF(5 km)"). FIG. 9B shows that a DCF having a length of 5 km which is located at a front portion is coupled to an EDF having a length of 25 m which is located at a rear portion (referred to as simply "DCF(5 km)EDF(25 m)". FIG. 9C shows that an EDF having a length of 25 m is located at a central portion to couple two DCF having a length of 2.5 km (referred to as simply "DCF(2.5 km)EDF(5 m) DCF(2.5 km)". If the optical fibers of FIGS. 9A to 9C are employed in the optical amplifier of FIG. 2, the almost same effect as the first embodiment of the present invention can be obtained.

Figure 10:
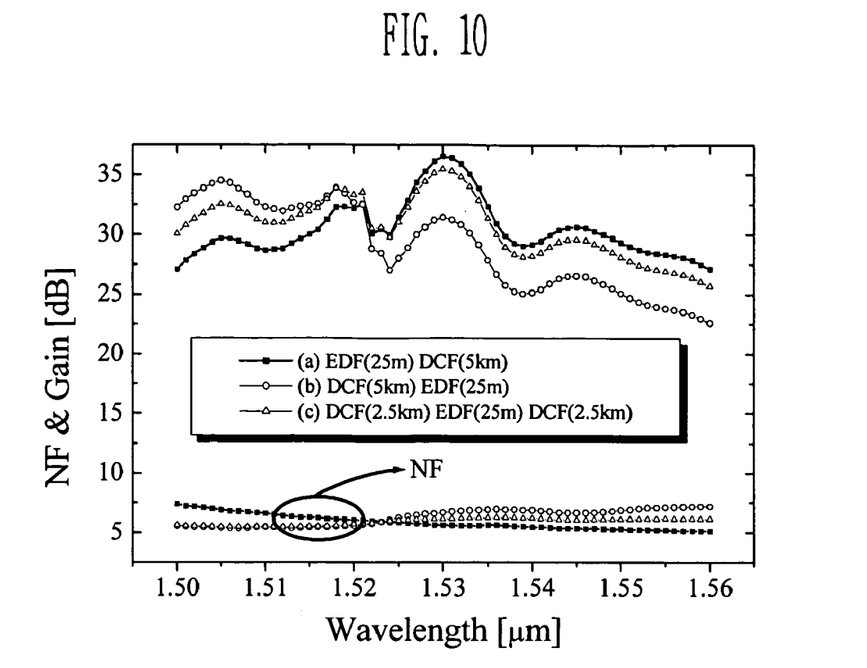
FIG. 10 is a graph illustrating a computer simulation result obtained by using the three optical fibers of FIGS. 9A to 9C.

FIG. 10 is a graph illustrating a computer simulation result obtained by the three optical fibers of FIGS. 9A to 9C. The used optical pumping power is 570 mW for both directions, and an input optical signal of −25 dBm is uniformly input through a wavelength of from 1,500 to 1,560 nm. In case of the EDF(25 m)DCF(5 km) (FIG. 9A), the gain band of the S-band and the C-band is flat except for a peak of 1,530 nm. However, the noise figure is more increased as it goes more in the direction of the S-band. In case of the DCF(5 km)EDF(25 m) (FIG. 9B), the S-band gain is greatly increased, and the noise figure is more increased as it goes more in the direction of the C-band. The DCF(2.5 km)EDF(25 m)DCF(2.5 km) (FIG. 9C) occupies a medium level of FIGS. 9A and 9B.

Flatness of a gain and flatness of a noise figure can be controlled by length of the DCF and length of the EDF, and conditions of optimizing two flatnesses can be obtained by appropriate combination of EDF and DCF.

According to the embodiment of the present invention, it is possible to simultaneously amplify the S-band and the C-band by a simplified structure compared to the EDFA which is commercially available, and since the existing Raman optical amplifier does not need to bind high power multi-wavelength pump lasers which are used to simultaneously amplify the S-band and the C-band together, there is competitiveness in terms of price.

As described above, the S-band and the C-band have been dealt. However, it is possible to extend the L-band more if pump LDs with two different wavelengths are used. It is because Raman amplification band moves according to a pumping wavelength. Similarly, all of the S-band, the C-band, and the L-band can be amplified.

Third Embodiment

Figure 11:
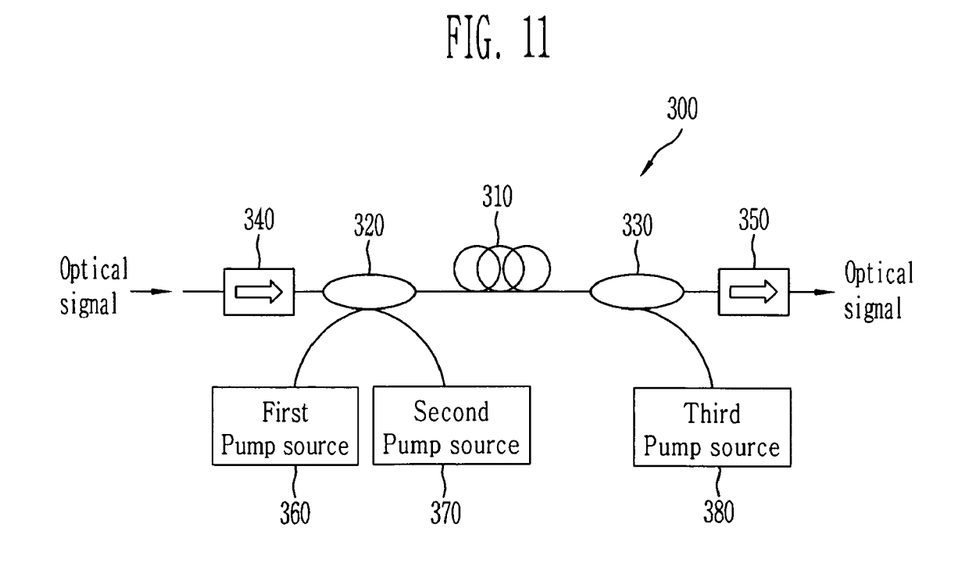
FIG. 11 is a schematic view of an optical fiber amplifier using an optical fiber according to a third embodiment of the present invention.

FIG. 11 is a schematic view of an optical fiber amplifier using an optical fiber according to a third embodiment of the present invention.

The optical fiber amplifier 300 includes first and second isolators 340 and 350, an optical fiber 310, first and second couplers 320 and 330, and first to third pump light sources 360, 370 and 380. Here, the light source which is a pumping source uses two wavelengths. For examples, the first and third pump light source have same wavelength and the second source has a different wavelength.

It is possible to amplify from 1,500 nm to 1,600 nm using pump LDs with two wavelengths. The existing Raman optical amplifier requires five or more pumping wavelengths for optical amplification and is also fastidious in gain flatness. However if we use simultaneously the amplification characteristics of erbium and Raman, 100 nm amplification is possible with pump LDs of two wavelengths, whereby efficient amplifier configuration is also possible.

Figure 12:
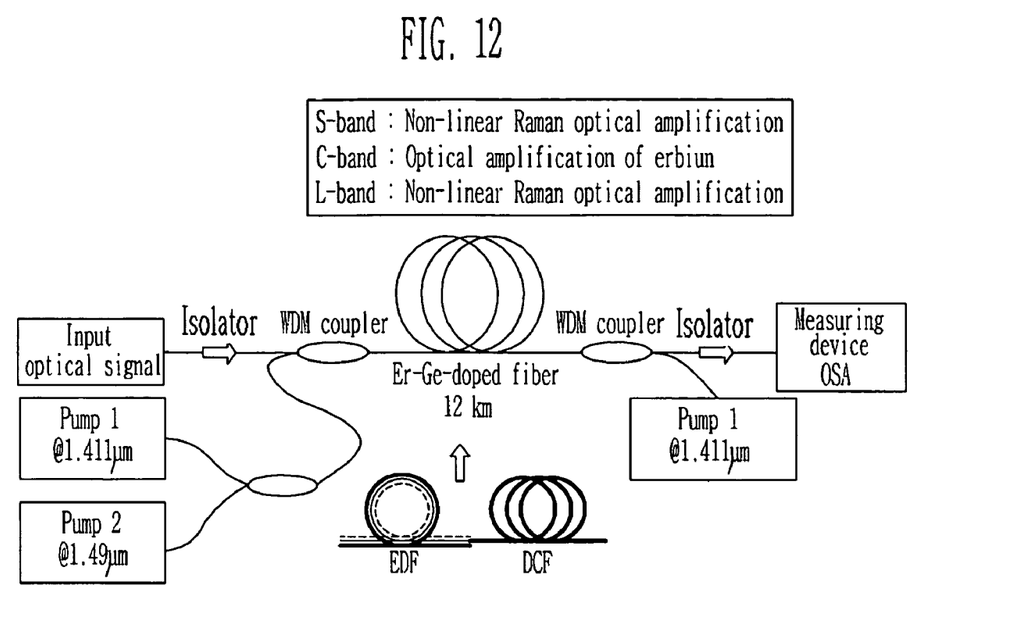
FIG. 12 is a view illustrating the implementation of the optical amplifier of FIG. 11.

FIG. 12 is a view illustrating the implementation of the optical amplifier of FIG. 11.

FIG. 12 shows a structure of the optical amplifier which performs pumping operation by three semiconductor pump lasers (1411 nm: 1 W for forward and backward, 1490 nm: 25 mW for forward) to simultaneously amplify the S-, C-, and L-bands. Even though the pumping power of the 1490 nm LD is relatively small about 25 mW, it is no matter what to amplify L-band signals through stimulated Raman scattering since the power of 1490 nm pumping light source is easily Raman-amplified from the 141 nm pumping light source. As the optical fiber, the optical fiber of the first or second embodiment can be used as it is. As the optical input signal, 100 channels are input at an interval of 1 nm from 1,500 nm to 1,600 nm, and intensity of each channel has optical power of −25 dBm.

Figure 13:
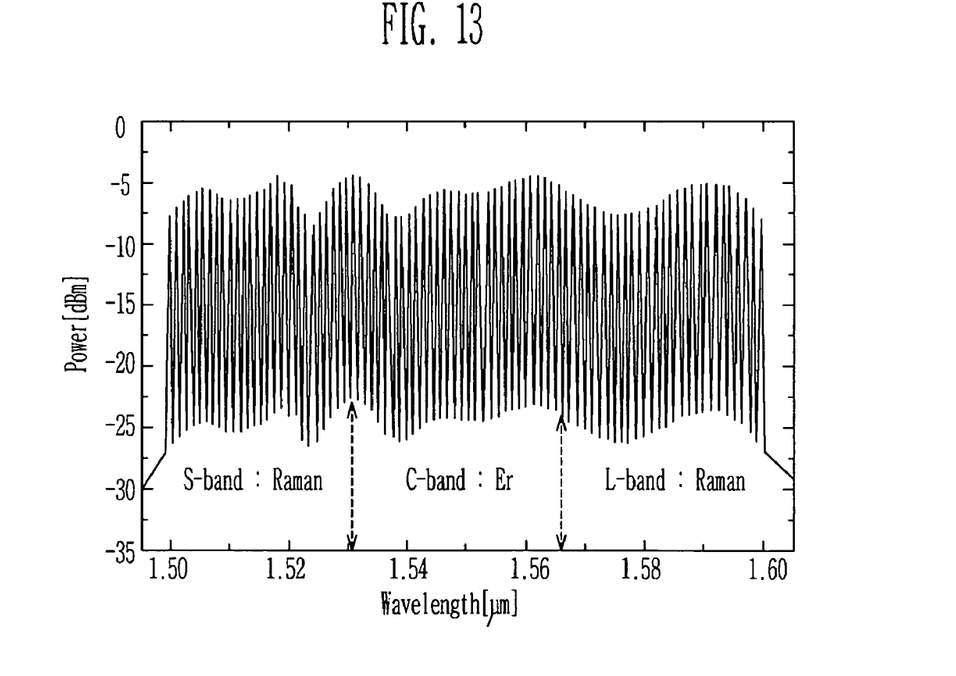
FIG. 13 is a graph illustrating a computer simulation result of the optical amplifier of FIG. 12.

FIG. 13 is a graph illustrating a computer simulation result of the optical amplifier of FIG. 12. The used fiber medium is the optical fiber configured into Ge-doped core and Er-doped cladding as shown in FIG. 1.

As shown in FIG. 13, the S-band signals are Raman-amplified in the core by a pump laser diode of 1411 nm wavelength, the L-band signals are also Raman-amplified in the core by the pump laser diode of 1490 nm wavelength, and optical amplification of the C-band is performed by erbium ions excited in the cladding by the two pump lasers. The total gain is about 20 dB, and gain flatness is within 5 dB.

The optical fiber which is employed in the optical amplifier according to the third embodiment may be replaced with the optical fiber according to the second embodiment. In this case, the optical fiber may be configured such that one first sub optical fiber in which a first element of causing the non-linear Raman amplification is doped in the core and one second sub optical fiber in which a second element which is a rare earth element is doped in the core are connected in series.

Optical amplification of the S-, C-, and L-bands is possible by using the optical fiber configured by combination of the EDF or DCF which is already commercialized and using the high power pump LDs of two different wavelengths.

Effects of the present invention are as follows.

Firstly, it is possible to simultaneously amplify the S- and C-bands signals with a simplified structure compared to the conventional EDFA which is commercially available, and there is competitiveness in terms of manufacturing cost compared to a case where the conventional Raman optical amplifier uses many high power pump lasers of multi-wavelength to simultaneously amplify the S- and C-bands.

Secondly, in a case where the EDF and the DCF which are commercially available are coupled to each other and so pumping is performed by a single wavelength, the optical amplifier which can simultaneously amplify the S- and C-bands signals can be easily configured, and thus it is easy to commercialize.

Thirdly, in a case where pumping operation is performed by two high power semiconductor lasers having different wavelengths, optical signals in both bands (i.e., S- and L-bands) adjacent to the C-band signals amplified by erbium can be amplified by Raman amplification, and configuration of the optical amplifier is simplified compared to all Raman amplifier which simultaneously amplifies the S-, C- and L-bands, whereby there is competitiveness in terms of price.

Lastly, in a case where the EDF and the DCF which are commercially available are coupled to each other and so pumping is performed by the pumping source of two wavelengths, the optical amplifier which can simultaneously amplify the S-, C- and L-bands signals can be easily configured, and thus it is easy to be commercialized.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. An optical fiber comprising:
   a core containing a first doping element at a concentration of about 10 mol % to about 20 mol % wherein the first doping element is not a rare earth element;
   a cladding containing a second doping element at a concentration of about 0.000004 mol % to about 0.0004 mol % (which corresponds to about $1\times10^{15}$ cm$^{-3}$ to about $1\times10^{17}$ cm$^{-3}$, respectively) wherein the second doping element is a rare earth element; and
   a composition material of the optical fiber is not the first and second doping elements,
   wherein the core containing the first doping element being configured to produce non-linear Raman stimulated gain at a first spectral band having a first gain when the core containing the first doping element is stimulated by at least one pumping source having a single wavelength, the pumping source having a wavelength between about 1,380 nm to about 1,420 nm, and
   wherein the cladding containing the second doping element being configured to produce direct-transition light amplification phenomenon at a second spectral band having a second gain when the cladding containing the second doping element is stimulated by the at least one pumping source,
   wherein the first spectral band has a wavelenath range of 1,490 nm to 1,530 nm (S-band), and
   wherein the second spectral band has a wavelength range of 1,530 nm to 1,570 nm (C-band).

2. The optical fiber of claim 1, wherein the composition material of the optical fiber includes silica, tellurite, fluoride, sulfides, or selenides.

3. The optical fiber of claim 1, wherein the first doping element includes one selected from a group consisting of silica, germanium, phosphor, sulfur, tellurium, and selenium, and the second doping element includes one selected from a group consisting of erbium, ytterbium, praseodymium, neodymium, holmium, thulium, and dysprosium.

4. The optical fiber of claim 1, wherein the composition material of the optical fiber is silica, the first doping element is germanium, and the second doping element is erbium.

5. The optical fiber of claim 1 wherein a difference between the first and second gains being about 5 dB whereby the optical fiber is configured to produce a relatively flat gain across the first and second spectral bands.

6. The optical fiber of claim 1 wherein the optical fiber having a refractive index difference between the core and the cladding of about 0.015 to 0.03.

7. The optical fiber of claim 1 further comprising
   a first coupler optically attached to one end of the optical fiber;
   a second coupler optically attached to another end of the optical fiber;
   at least one pumping source optically attached to one of the first couplers;
   a first isolator optically attached to the first coupler; and
   a second isolator optically attached to the second coupler.

8. An optical fiber comprising
   a core containing a first do in element at a concentration of about 10 mol % to about 20 mol % wherein the first doping element is not a rare earth element;
   a cladding containing a second doping element at a concentration of about 0.000004 mol % to about 0.0004 mol % (which corresponds to about $1\times10^{15}$ cm$^{-3}$ to about $1\times10^{17}$ cm$^{-3}$, respectively) wherein the second do in element is a rare earth element; and
   a composition material of the optical fiber is not the first and second doping elements,
   wherein the core containing the first doping element is configured to produce non-linear Raman stimulated gain at a first spectral band having a first gain when the core containing the first doping element is stimulated by pumping sources having the shorter wavelength of pumping sources having two different wavelengths,
   wherein the cladding containing the second doping element is configured to produce direct-transition light amplification phenomenon at a second spectral band having a second gain when the cladding containing the second doping element is stimulated simultaneously by the pumping sources having two different wavelengths, and
   wherein the core containing the first doping element is configured to induce non-linear Raman stimulated gain at a third spectral band having a third gain when the core containing the first doping element is stimulated by pumping sources having the longer wavelength of the pumping sources having two different wavelengths.

9. The optical fiber of claim 8 wherein
the shorter wavelength light has a wavelength of 1,380 nm to 1,420 nm,
the longer wavelength light has a wavelength of 1,480 nm to 1,500 nm,
the first spectral band has a wavelength range of 1,490 nm to 1,530 nm (S-band),
the second spectral band has a wavelength range of 1,530 nm to 1,570 nm (C-band), and
the third spectral band has a wavelength range of 1,570 nm to 1,610 nm (L-band).

10. The optical fiber of claim 5 wherein the optical fiber being configured to produce the relatively flat gain across the first and second spectral bands using an adaptation selected from the group consisting of adjusting a length of the optical fiber, adjusting an optical pumping power of at least one pumping source, adjusting first doping element concentration, adjusting a second doping element concentration, adjusting an effective core area, adjusting a difference in refractive index between the core and the cladding, adding an optical filter and combinations thereof.

11. The optical fiber of claim 8, wherein a difference between the first, second, and third gains being in 5 dB whereby the optical fiber is configured to produce a relatively flat gain across the first, second and third spectral bands.

12. The optical fiber of claim 8, wherein the composition material of the optical fiber includes silica, tellurite, fluoride, sulfides, or selenides.

13. The optical fiber of claim 8, wherein the first doping element includes one selected from a group consisting of silica, germanium, phosphor, sulfur, tellurium, and selenium, and the second doping element includes one selected from a group consisting of erbium, ytterbium, praseodymium, neodymium, holmium, thulium, and dysprosium.

14. The optical fiber of claim 8, wherein the composition material of the optical fiber is silica, the first doping element is germanium, and the second doping element is erbium.

15. The optical fiber of claim 8, wherein the optical fiber having a refractive index difference between the core and the cladding of about 0.015 to 0.03.

16. The optical fiber of claim 8 further comprising
a first coupler optically attached to one end of the optical fiber;
a second coupler optically attached to another end of the optical fiber;
at least one pumping source optically attached to one of the first couplers;
a first isolator optically attached to the first coupler; and
a second isolator optically attached to the second coupler.

17. A optical fiber comprising:
a core containing a first doping element at a concentration of about 10 mol % to about 20 mol % wherein the first doping element is not a rare earth element in which the first doping element is selected from a group consisting of silica, germanium, phosphor, sulfur, tellurium, and selenium;
a cladding containing a second doping element at a concentration of about 0.000004 mol % to about 0.0004 mol % (which corresponds to about $1\times10^{15}$ cm$^{-3}$ to about $1\times10^{17}$ cm$^{-3}$, respectively) wherein the second doping element is a rare earth element in which the second doping element is selected from the group consisting of erbium, ytterbium, praseodymium, neodymium, holmium, thulium, and dysprosium; and
a composition material of the optical fiber is not the first and second doping elements;
a refractive index difference between the core and the cladding of about 0.015 to 0.03;
a first coupler optically attached to one end of the optical fiber;
a second coupler optically attached to another end of the optical fiber;
one or more pumping sources optically attached to one of the couplers;
a first isolator optically attached to the first coupler; and
a second isolator optically attached to the second coupler
wherein
the core containing the first doping element being configured to produce non-linear Raman stimulated gain at a first spectral band having a first gain when the core containing the first doping element is stimulated by pumping sources having the shorter wavelength of the pumping sources having two different wavelengths,
the cladding containing the second doping element being configured to produce direct-transition light amplification phenomenon at a second spectral band having a second gain when the cladding containing the second doping element is stimulated simultaneously pumping sources having two different wavelengths,
the core containing the first doping element being configured to induce non-linear Raman stimulated gain at a third spectral band having a third gain when the core containing the first doping element is stimulated by pumping sources having the longer wavelength of the pumping sources having two different wavelengths,
a difference between the first, second and third gains being in 5 dB whereby the optical fiber is configured to produce a relatively flat gain across the first, second and third spectral bands,
the shorter wavelength light has a wavelength of 1,380 nm to 1,420 nm,
the longer wavelength light has a wavelength of 1,480 nm to 1,500 nm,
the first spectral band has a wavelength range of 1,490 nm to 1,570 nm (S-band),
the second spectral band has a wavelength range of 1,530 nm to 1,570 nm (C-band), and
the third spectral band has a wavelength range of 1,570 nm to 1,610 nm (L-band).

* * * * *

UNITED STATES PATENT AND TRADEMARK OFFICE
CERTIFICATE OF CORRECTION

PATENT NO. : 7,440,165 B2 Page 1 of 1
APPLICATION NO. : 11/196717
DATED : October 21, 2008
INVENTOR(S) : Hong Seok Seo et al.

It is certified that error appears in the above-identified patent and that said Letters Patent is hereby corrected as shown below:

Title page
Item (30) Foreign Application Priority Data -- delete "Dec. 14, 2000" and insert --Dec. 14, 2004--.

Signed and Sealed this

Sixth Day of January, 2009

JON W. DUDAS
*Director of the United States Patent and Trademark Office*